United States Patent
Cai et al.

(10) Patent No.: US 11,924,819 B2
(45) Date of Patent: Mar. 5, 2024

(54) POWER LIMITS BASED ON SIGNAL TYPE FOR MANAGING MAXIMUM PERMISSIBLE EXPOSURE

(71) Applicant: QUALCOMM Incorporated, San Diego, CA (US)

(72) Inventors: Mingming Cai, San Jose, CA (US); Junsheng Han, Sunnyvale, CA (US); Raghu Narayan Challa, San Diego, CA (US); Tienyow Liu, Santa Clara, CA (US); Jing Lin, Milpitas, CA (US); Jagadish Nadakuduti, Mission Viejo, CA (US); Lin Lu, San Diego, CA (US); Farhad Meshkati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/930,196

(22) Filed: May 12, 2020

(65) Prior Publication Data
US 2020/0374882 A1 Nov. 26, 2020

Related U.S. Application Data

(60) Provisional application No. 62/852,795, filed on May 24, 2019.

(51) Int. Cl.
*H04W 72/044* (2023.01)
*H04W 52/36* (2009.01)
(Continued)

(52) U.S. Cl.
CPC ..... *H04W 72/0473* (2013.01); *H04W 52/367* (2013.01); *H04W 72/21* (2023.01); *H04W 72/56* (2023.01)

(58) Field of Classification Search
None
See application file for complete search history.

(56) References Cited

U.S. PATENT DOCUMENTS

| 8,526,389 B2 * | 9/2013 | Dinan | H04W 56/0045 |
| | | | 370/329 |
| 8,855,131 B2 * | 10/2014 | Imamura | H04L 5/0053 |
| | | | 370/430 |

(Continued)

FOREIGN PATENT DOCUMENTS

| EP | 2378819 A2 | 10/2011 |
| EP | 2739094 A1 | 6/2014 |
| WO | 2013181444 A2 | 12/2013 |

OTHER PUBLICATIONS

Interdigital, Inc: "Power Sharing Mechanisms with LTE-NR DC and NR," 3GPP Draft, R1-1714118, 3GPP TSG RAN WG1#90, (R15 NR WI AI 6171 Power Sharing), 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017, XP051316907, 7 pages, Retrieved from the Internet: URL: http://www.3gpp.org/ftp/Meetings_3GPP_SYNC/RAN1/Docs/ [retrieved on Aug. 20, 2017], section 4.1. 3.

(Continued)

*Primary Examiner* — Gregory B Sefcheck
(74) *Attorney, Agent, or Firm* — Patterson & Sheridan, L.L.P/Qualcomm Incorporated

(57) ABSTRACT

Methods and systems for determining transmission power levels according to signal types and RF exposure limits. An example method generally includes determining a first transmission power for transmitting a first type of uplink (UL) signal, determining a second transmission power for transmitting a second type of UL signal based on the first transmission power, and transmitting at least one of the first (Continued)

UL signal according to the first transmission power or the second UL signal according to the second transmission power.

24 Claims, 7 Drawing Sheets

(51) Int. Cl.
  *H04W 72/21* (2023.01)
  *H04W 72/56* (2023.01)

(56) References Cited

U.S. PATENT DOCUMENTS

| | | | | |
|---|---|---|---|---|
| 8,982,801 | B2* | 3/2015 | Shin | H04W 52/242 |
| | | | | 370/329 |
| 9,020,556 | B2* | 4/2015 | Haim | H04W 52/365 |
| | | | | 455/522 |
| 9,215,686 | B2* | 12/2015 | Kazmi | H04W 52/365 |
| 9,288,770 | B2* | 3/2016 | Loehr | H04W 52/365 |
| 9,379,874 | B2* | 6/2016 | Noh | H04L 5/0051 |
| 9,380,541 | B1* | 6/2016 | Lu | H04W 52/367 |
| 9,661,588 | B2* | 5/2017 | Takaoka | H04W 52/346 |
| 9,749,963 | B2* | 8/2017 | Hwang | H04W 52/288 |
| 9,918,285 | B2* | 3/2018 | Gao | H04W 52/367 |
| 10,206,181 | B2* | 2/2019 | Ekpenyong | H04W 52/325 |
| 10,271,287 | B2* | 4/2019 | Sun | H04W 52/246 |
| 10,291,377 | B2* | 5/2019 | Hwang | H04L 5/00 |
| 10,383,067 | B2* | 8/2019 | Lin | H04W 52/146 |
| 10,440,656 | B2* | 10/2019 | Fan | H04W 52/146 |
| 10,447,413 | B1* | 10/2019 | Nadakuduti | H04B 17/18 |
| 10,652,833 | B2* | 5/2020 | Nadakuduti | H04W 52/38 |
| 10,798,731 | B2* | 10/2020 | Lee | H04W 72/1289 |
| 10,856,236 | B1* | 12/2020 | Manolakos | H04W 52/242 |
| 10,880,838 | B2* | 12/2020 | Chen | H04L 5/0092 |
| 10,887,842 | B2* | 1/2021 | Fu | H04W 80/08 |
| 10,897,741 | B2* | 1/2021 | Yi | H04W 52/34 |
| 11,019,623 | B2* | 5/2021 | Lee | H04W 4/70 |
| 2003/0064761 | A1* | 4/2003 | Nevermann | H04W 52/367 |
| | | | | 455/572 |
| 2011/0280169 | A1* | 11/2011 | Seo | H04W 72/0406 |
| | | | | 370/311 |
| 2012/0142291 | A1 | 6/2012 | Rath et al. | |
| 2013/0324182 | A1* | 12/2013 | Deng | H04W 52/383 |
| | | | | 455/522 |
| 2014/0133449 | A1* | 5/2014 | Xu | H04W 52/367 |
| | | | | 370/329 |
| 2014/0155119 | A1* | 6/2014 | Bishop | H04W 52/36 |
| | | | | 455/552.1 |
| 2014/0187281 | A1* | 7/2014 | Faraone | H04W 52/146 |
| | | | | 455/522 |
| 2014/0370830 | A1* | 12/2014 | Steer | H04W 52/288 |
| | | | | 455/127.1 |
| 2015/0271761 | A1* | 9/2015 | Park | H04W 72/1242 |
| | | | | 370/329 |
| 2016/0174162 | A1* | 6/2016 | Nadakuduti | H04B 1/3838 |
| | | | | 455/67.11 |
| 2016/0174168 | A1* | 6/2016 | Lu | H04W 52/26 |
| | | | | 455/522 |
| 2016/0286497 | A1 | 9/2016 | Park | |
| 2017/0064641 | A1* | 3/2017 | Logan | H04W 52/36 |
| 2017/0265148 | A1* | 9/2017 | Balasubramanian | |
| | | | | H04W 52/248 |
| 2017/0332333 | A1* | 11/2017 | Santhanam | H04W 52/367 |
| 2018/0167897 | A1* | 6/2018 | Sampath | H04W 72/1205 |
| 2019/0191392 | A1* | 6/2019 | Reial | H04W 52/38 |
| 2019/0222326 | A1* | 7/2019 | Dunworth | H04B 1/04 |
| 2019/0349017 | A1* | 11/2019 | Kaidar | H04B 1/3838 |
| 2020/0329485 | A1* | 10/2020 | Tsai | H04L 1/0003 |
| 2020/0389856 | A1* | 12/2020 | Yao | H04B 17/26 |
| 2021/0058104 | A1* | 2/2021 | Hou | H04W 52/0261 |
| 2021/0250855 | A1* | 8/2021 | Tang | H04W 52/0216 |
| 2021/0385764 | A1* | 12/2021 | Pei | H04B 7/0639 |
| 2022/0022177 | A1* | 1/2022 | Xing | H04W 72/51 |
| 2022/0053429 | A1* | 2/2022 | Hu | H04W 52/367 |
| 2022/0166478 | A1* | 5/2022 | Wigren | H04B 7/0465 |

OTHER PUBLICATIONS

International Search Report and Written Opinion—PCT/US2020/032633—ISA/EPO—dated Jul. 23, 2020.
Samsung: "Offline Summary of UL Power Control—CA Aspects," 3GPP Draft, 3GPP TSG RAN WG1 Meeting 91, R1-1721548, 7.6.2_Offline Summary of UL PC-CA Aspects (R1-1721422), 3rd Generation Partnership Project (3GPP), Mobile Competence Centre, 650, Route Des Lucioles, F-06921, Sophia-Antipolis Cedex, France, vol. RAN WG1, No. Reno, USA; Nov. 27, 2017-Dec. 1, 2017, Dec. 1, 2017 (Dec. 1, 2017), XP051370599, pp. 1-9, Retrieved from the Internet: URL: http://www.3gpp.org/ftp/tsg%5Fran/WG1%5FRL1/TSGR1%5F91/Docs/ [retrieved on Dec. 1, 2017].

* cited by examiner

POWER LIMITS BASED ON SIGNAL TYPE FOR MANAGING MAXIMUM PERMISSIBLE EXPOSURE

CROSS-REFERENCE TO RELATED APPLICATIONS

This application claims benefit of and priority to U.S. Provisional Application No. 62/852,795, filed May 24, 2019, which is assigned to the assignee hereof and hereby expressly incorporated by reference herein in its entirety as if fully set forth below and for all applicable purposes.

FIELD OF THE DISCLOSURE

Certain aspects of the present disclosure generally relate to wireless devices and, more particularly, to systems and methods for signal-type-based power limits.

DESCRIPTION OF RELATED ART

Modern wireless devices (such as cellular phones) are generally required to meet radio frequency (RF) exposure limits set by domestic and international standards and regulations. To ensure compliance with the standards, such devices must currently undergo an extensive certification process prior to being shipped to market. To ensure that a wireless device complies with an RF exposure limit, techniques have been developed to enable the wireless device to assess RF exposure from the wireless device in real time and adjust the transmission power of the wireless device accordingly to comply with the RF exposure limit.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include improved systems and methods for assessing RF exposure from a wireless device.

Certain aspects of the present disclosure provide a method for wireless communications by a user equipment (UE). The method generally includes determining a first transmission power for transmitting a first type of uplink (UL) signal, determining a second transmission power for transmitting a second type of UL signal based on the first transmission power, and transmitting at least one of the first UL signal according to the first transmission power or the second UL signal according to the second transmission power.

Certain aspects of the present disclosure provide an apparatus for wireless communications. The apparatus generally includes at least one processor configured to determine a first transmission power for transmitting a first type of UL signal and to determine a second transmission power for transmitting a second type of UL signal based on the first transmission power, and a transmitter configured to transmit at least one of the first UL signal according to the first transmission power or the second UL signal according to the second transmission power. The apparatus may also generally include a memory coupled with the at least one processor.

Certain aspects of the present disclosure provide an apparatus for wireless communications. The apparatus generally includes means for determining a first transmission power for transmitting a first type of UL signal, means for determining a second transmission power for transmitting a second type of UL signal based on the first transmission power, and means for transmitting at least one of the first UL signal according to the first transmission power or the second UL signal according to the second transmission power.

Certain aspects of the present disclosure provide a non-transitory computer-readable medium for wireless communications by a UE. The non-transitory computer-readable medium generally includes instructions that, when executed by at least one processor, cause the at least one processor to determine a first transmission power for transmitting a first type of UL signal, determine a second transmission power for transmitting a second type of UL signal based on the first transmission power, and control the UE to transmit at least one of the first UL signal according to the first transmission power or the second UL signal according to the second transmission power.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
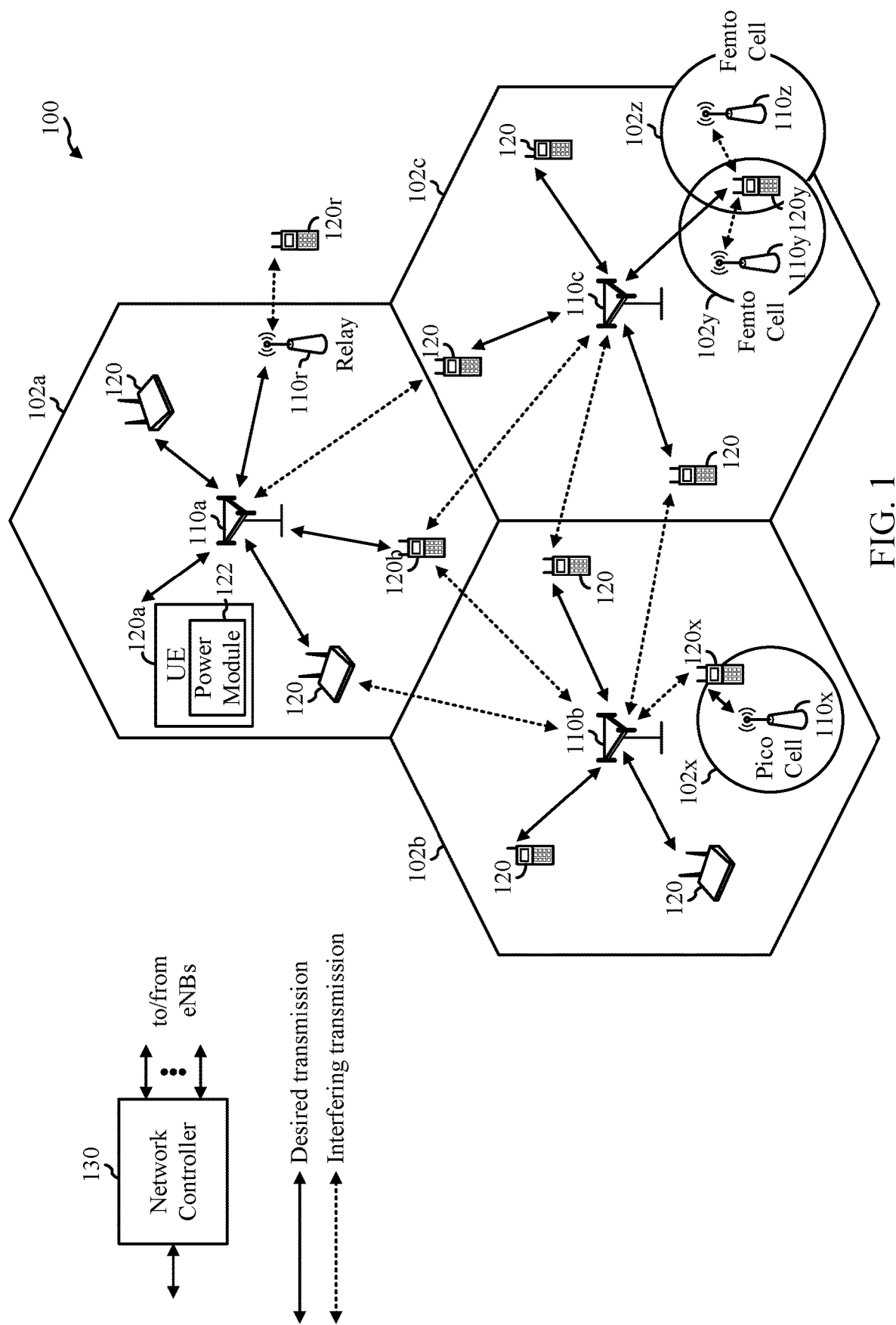
FIG. 1 is a block diagram conceptually illustrating an example telecommunications system, in accordance with certain aspects of the present disclosure.

Aspects of the present disclosure provide apparatus and methods for determining transmission power levels according to signal types and RF exposure limits. For example, in some cases, a wireless device may determine a first transmission power for transmitting a first type of uplink (UL) signal and a second transmission power for transmitting a second type of UL signal based on the first transmission power. Thereafter, the wireless device may transmit at least one of the first UL signal according to the first transmission power or the second UL signal according to the second transmission power.

The following description provides examples of determining transmission power levels according to signal types and RF exposure limits in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for determining transmission power levels according to signal types and RF exposure limits. For example, as shown in FIG. 1, the UE 120a may include a power module 122. The power module 122 may be configured to perform the operations illustrated in FIGS. 4 and 6, as well as other operations disclosed herein for determining transmission power levels according to signal types and RF exposure limits, in accordance with aspects of the present disclosure.

Figure 2:
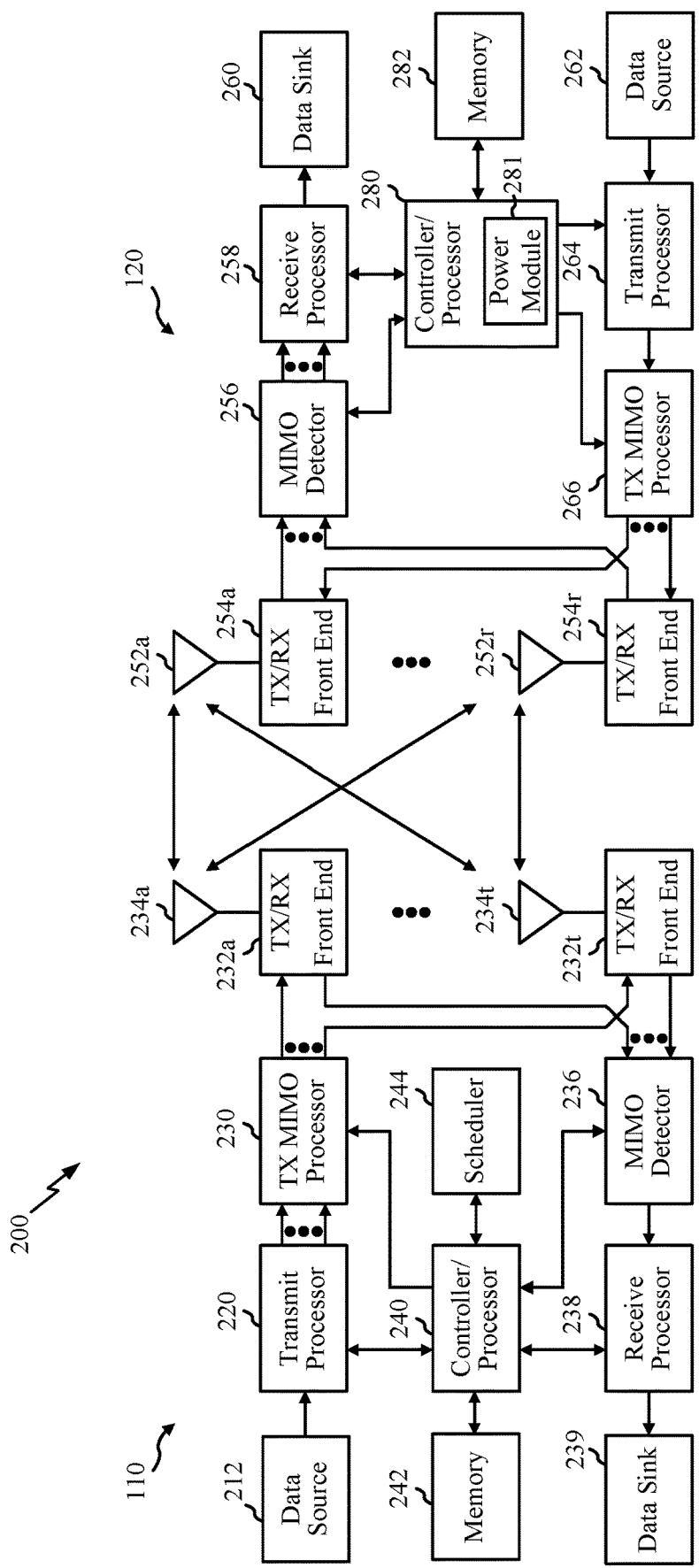
FIG. 2 is a block diagram conceptually illustrating a design of an example base station (BS) and an example user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the transmit (TX) front-end circuits 232a through 232t. Each TX front-end circuit 232 may process a respective output symbol stream (e.g., for OFDM, etc.) to obtain an output sample stream. Each TX front-end circuit may further process (e.g., convert to analog, amplify, filter, and upconvert) the output sample stream to obtain a downlink signal. Downlink signals from TX front-end circuits 232a through 232t may be transmitted via the antennas 234a through 234t, respectively.

At the UE 120a, the antennas 252a-252r may receive the downlink signals from the BS 110a and may provide received signals to the receive (RX) front-end circuits 254a through 254r, respectively. Each RX front-end circuit 254 may condition (e.g., filter, amplify, downconvert, and digitize) a respective received signal to obtain input samples. Each RX front-end circuit may further process the input samples (e.g., for OFDM, etc.) to obtain received symbols. A MIMO detector 256 may obtain received symbols from all the RX front-end circuits 254a through 254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the RX front-end circuits 254a through 254r (e.g., for SC-FDM, etc.), and transmitted to the BS 110a. At the BS 110a, the uplink signals from the UE 120a may be received by the antennas 234, processed by the TX front-end circuits 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The controllers/processors 240 and 280 may direct the operation at the BS 110 and the UE 120, respectively. The processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink. In certain aspects, the TX/RX front-end circuits 232, 254 may include a tuning circuit for adjusting a source impedance seen by a portion of a receive path, as further described herein.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 280 of the UE 120a includes a power module 281 that may be configured to perform the operations illustrated in FIGS. 4 and 6, as well as other operations described herein for determining transmission power levels according to signal types and RF exposure limits, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kHz, and other SCS may be defined with respect to the base SCS (e.g., 30 kHz, 60 kHz, 120 kHz, 240 kHz, etc.).

Figure 3:
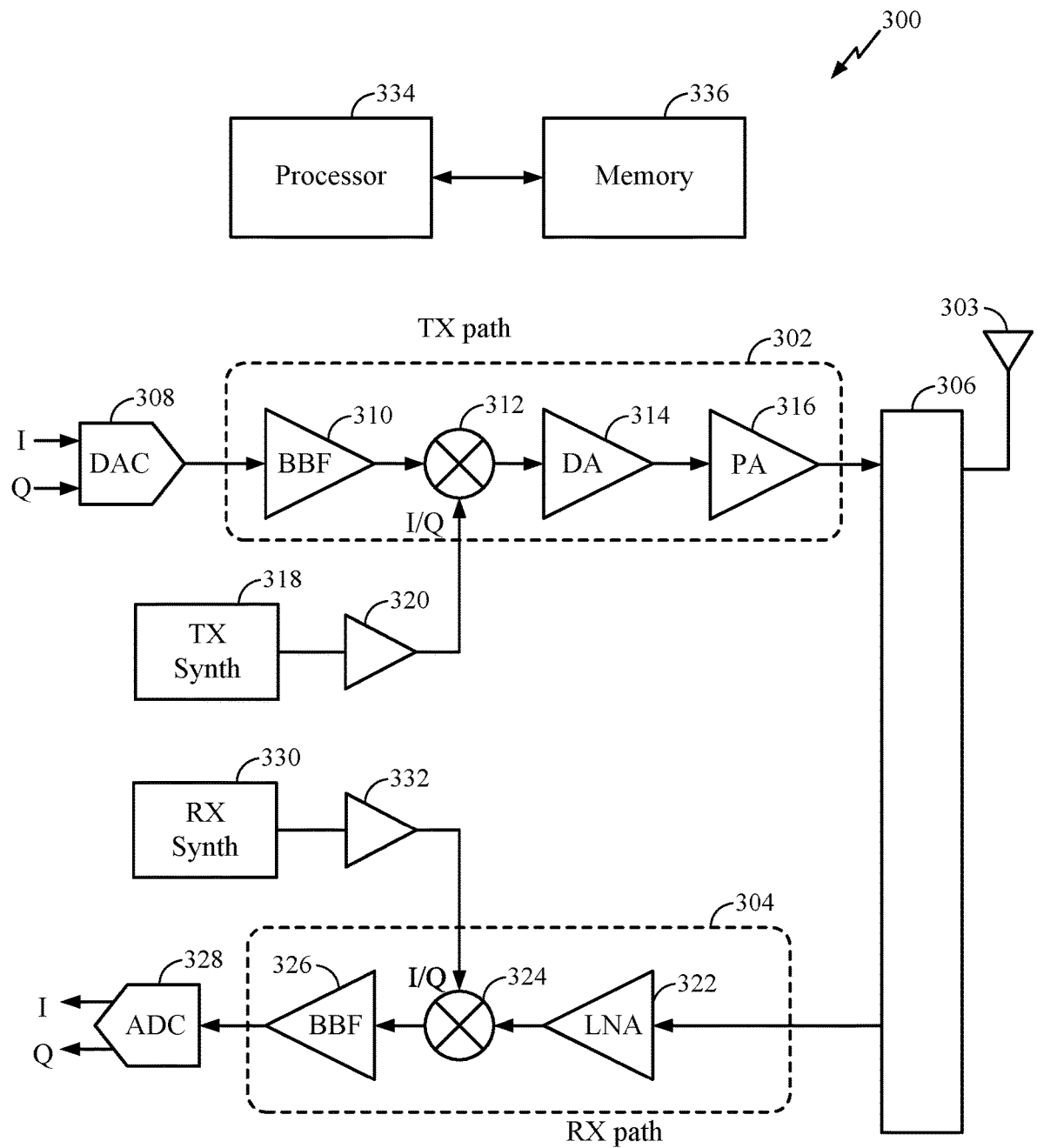
FIG. 3 is a block diagram showing an example transceiver front-end, in accordance with certain aspects of the present disclosure.

FIG. 3 is a block diagram of an example transceiver front-end 300, such as TX/RX front-end circuits 232, 254 in FIG. 2, in accordance with certain aspects of the present disclosure. The transceiver front-end 300 includes at least one transmit (TX) path 302 (also known as a transmit chain) for transmitting signals via one or more antennas and at least one receive (RX) path 304 (also known as a receive chain) for receiving signals via the antennas. When the TX path 302 and the RX path 304 share an antenna 303, the paths may be connected with the antenna via an RF interface 306, which may include any of various suitable RF devices, such as a duplexer, a switch, a diplexer, and the like.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier (PA) 316. The BBF 310, the mixer 312, and the DA 314 may be included in a radio frequency integrated circuit (RFIC), while the PA 316 may be included in the RFIC or external to the RFIC. The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 312 are typically RF signals, which may be amplified by the DA 314 and/or by the PA 316 before transmission by the antenna 303.

The RX path 304 may include a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert). The baseband signals output by the mixer 324 may be filtered by the BBF 326 before being converted by an analog-to-digital converter (ADC) 328 to digital I or Q signals for digital signal processing.

While it is desirable for the output of an LO to remain stable in frequency, tuning to different frequencies may indicate using a variable-frequency oscillator, which can involve compromises between stability and tunability. Contemporary systems may employ frequency synthesizers with a voltage-controlled oscillator (VCO) to generate a stable, tunable LO with a particular tuning range. Thus, the transmit LO may be produced by a TX frequency synthesizer 318, which may be buffered or amplified by amplifier 320 before being mixed with the baseband signals in the mixer 312. Similarly, the receive LO may be produced by an RX frequency synthesizer 330, which may be buffered or amplified by amplifier 332 before being mixed with the RF signals in the mixer 324.

Example RF Exposure Measurement

As shown, the transceiver front-end 300 may also include a processor 334 and memory 336 coupled to the TX path 302. The processor 334 may determine time-averaged radio frequency (RF) exposure measurements based on transmission power levels applied to the TX path 302 (e.g., gain levels for the PA 316) to set a transmission power level for a future time slot that meets a predetermined RF exposure limit set by domestic and international regulations, as further described herein. RF exposure may be expressed in terms of a specific absorption rate (SAR), which is a measure of energy absorption by human tissue per unit mass and may have units of watts per kilogram (W/kg). Radio frequency exposure may also be expressed in terms of power density (PD), which is a measure of energy absorption per unit area and may have units of mW/cm².

In some cases, SAR may be used to assess RF exposure for transmission frequencies less than 6 GHz, covering wireless communication technologies such as 3G (e.g., CDMA), 4G (e.g., LTE), 5G (e.g., NR in 6 GHz bands), IEEE 802.11ac, and the like. Power density may be used to assess RF exposure for transmission frequencies higher than 10 GHz, covering wireless communication technologies such as IEEE 802.11ad, 802.11ay, 5G, and the like. Thus, different metrics may be used to assess RF exposure for different wireless communication technologies.

A wireless device (e.g., UE 120) may simultaneously transmit signals using multiple wireless communication technologies. For example, the wireless device may simultaneously transmit signals using a first wireless communication technology operating at or below 6 GHz (e.g., 3G, 4G, 5G, etc.) and a second wireless communication technology operating above 6 GHz (e.g., 5G in 24 to 60 GHz bands, IEEE 802.11ad or 802.11ay). In certain aspects, the wireless device may simultaneously transmit signals using the first wireless communication technology (e.g., 3G, 4G, 5G in 6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD.

To assess RF exposure from transmissions using the first technology (e.g., 3G, 4G, 5G in 6 GHz bands, IEEE 802.11ac, etc.), the wireless device may include multiple SAR distributions for the first technology stored in memory (e.g., memory 282 of FIG. 2 or memory 336 of FIG. 3). Each of the SAR distributions may correspond to a respective transmit scenario of multiple transmit scenarios supported by the wireless device for the first technology. The transmit scenarios may correspond to various combinations of antennas (e.g., antennas 252a through 252r of FIG. 2 or antenna 303 of FIG. 3), frequency bands, channels and/or body positions, as discussed further below.

The SAR distribution (also referred to as a SAR map) for each transmit scenario may be generated based on measurements (e.g., E-field measurements) performed in a test laboratory using a model of a human body. After the SAR distributions are generated, the SAR distributions may be stored in the memory to enable a processor (e.g., processor 266 of FIG. 2 or processor 334 of FIG. 3) to assess RF exposure in real time, as discussed further below. Each SAR distribution includes a set of SAR values, where each SAR value may correspond to a different location (e.g., on the model of the human body). Each SAR value may comprise a SAR value averaged over a mass of 1 g or 10 g at the respective location.

The SAR values in each SAR distribution may correspond to a particular transmission power level (e.g., the transmission power level at which the SAR values were measured in the test laboratory). Accordingly, since SAR scales with transmission power level, the processor may scale a SAR distribution for any transmission power level by multiplying each SAR value in the SAR distribution by the following transmission power scaler:

$$\frac{Tx_c}{Tx_{SAR}} \qquad \text{(eq. 1)}$$

where $Tx_c$ is a current transmission power level for the respective transmit scenario, and $Tx_{SAR}$ is the transmission power level corresponding to the SAR values in the stored SAR distribution (e.g., the transmission power level at which the SAR values were measured in the test laboratory).

As discussed above, the wireless device may support multiple transmit scenarios for the first technology. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless device relative to the user's body location (head, trunk, away from the body, etc.), and/or other parameters. In cases where the wireless device supports a large number of transmit scenarios, it may be very time-consuming and expensive to perform measurements for each transmit scenario in a test setting (e.g., test laboratory). To reduce test time, measurements may be performed for a subset of the transmit scenarios to generate SAR distributions for the subset of transmit scenarios. In this example, the SAR distribution for each of the remaining transmit scenarios may be generated by combining two or more of the SAR distributions for the subset of transmit scenarios, as discussed further below.

For example, SAR measurements may be performed for each one of the antennas to generate a SAR distribution for each one of the antennas. In this example, a SAR distribution for a transmit scenario in which two or more of the antennas are active may be generated by combining the SAR distributions for the two or more active antennas.

In another example, SAR measurements may be performed for each one of multiple frequency bands to generate a SAR distribution for each one of the multiple frequency bands. In this example, a SAR distribution for a transmit scenario in which two or more frequency bands are active may be generated by combining the SAR distributions for the two or more active frequency bands.

In certain aspects, a SAR distribution may be normalized with respect to a SAR limit by dividing each SAR value in the SAR distribution by the SAR limit. In this case, a normalized SAR value exceeds the SAR limit when the normalized SAR value is greater than one, and is below the SAR limit when the normalized SAR value is less than one. In these aspects, each of the SAR distributions stored in the memory may be normalized with respect to a SAR limit.

In certain aspects, the normalized SAR distribution for a transmit scenario may be generated by combining two or more normalized SAR distributions. For example, a normalized SAR distribution for a transmit scenario in which two or more antennas are active may be generated by combining the normalized SAR distributions for the two or more active antennas. For the case in which different transmission power levels are used for the active antennas, the normalized SAR distribution for each active antenna may be scaled by the respective transmission power level before combining the normalized SAR distributions for the active antennas. The normalized SAR distribution for simultaneous transmission from multiple active antennas may be given by the following:

$$SAR_{norm\_combined} = \sum_{i=1}^{i=K} \frac{Tx_i}{Tx_{SARi}} \cdot \frac{SAR_i}{SAR_{lim}} \quad \text{(eq. 2)}$$

where $SAR_{lim}$ is a SAR limit, $SAR_{norm\_combined}$ is the combined normalized SAR distribution for simultaneous transmission from the active antennas, i is an index for the active antennas, $SAR_i$ is the SAR distribution for the $i^{th}$ active antenna, $Tx_i$ is the transmission power level for the $i^{th}$ active antenna, $Tx_{SARi}$ is the transmission power level for the SAR distribution for the $i^{th}$ active antenna, and K is the number of the active antennas.

Equation 2 may be rewritten as follows:

$$SAR_{norm\_combined} = \sum_{i=1}^{i=K} \frac{Tx_i}{Tx_{SARi}} \cdot SAR_{norm\_i} \quad \text{(eq. 3a)}$$

where $SAR_{norm\_i}$ is the normalized SAR distribution for the $i^{th}$ active antenna. In the case of simultaneous transmissions using multiple active antennas at the same transmitting frequency (e.g., multiple in multiple out (MIMO)), the combined normalized SAR distribution may be obtained by summing the square root of the individual normalized SAR distributions and computing the square of the sum, as given by the following:

$$SAR_{norm\_combined\_MIMO} = \left[\sum_{i=1}^{i=K} \sqrt{\frac{Tx_i}{Tx_{SARi}} \cdot SAR_{norm\_i}}\right]^2. \quad \text{(eq. 3b)}$$

In another example, normalized SAR distributions for different frequency bands may be stored in the memory. In this example, a normalized SAR distribution for a transmit scenario in which two or more frequency bands are active may be generated by combining the normalized SAR distributions for the two or more active frequency bands. For the case where the transmission power levels are different for the active frequency bands, the normalized SAR distribution for each of the active frequency bands may be scaled by the respective transmission power level before combining the normalized SAR distributions for the active frequency bands. In this example, the combined SAR distribution may also be computed using equation 3a in which i is an index for the active frequency bands, $SAR_{norm\_i}$ is the normalized SAR distribution for the $i^{th}$ active frequency band, $Tx_i$ is the transmission power level for the $i^{th}$ active frequency band, and $Tx_{SARi}$ is the transmission power level for the normalized SAR distribution for the $i^{th}$ active frequency band.

To assess RF exposure from transmissions using the second technology (e.g., 5G in 24 to 60 GHz bands, IEEE 802.11ad, 802.11ay, etc.), the wireless device may include multiple PD distributions for the second technology stored in the memory (e.g., memory 282 of FIG. 2 or memory 336 of FIG. 3). Each of the PD distributions may correspond to a respective one of multiple transmit scenarios supported by the wireless device for the second technology. The transmit scenarios may correspond to various combinations of antennas (e.g., antennas 252*a* through 252*r* of FIG. 2 or antenna 303 of FIG. 3), frequency bands, channels and/or body positions, as discussed further below.

The PD distribution (also referred to as PD map) for each transmit scenario may be generated based on measurements (e.g., E-field measurements) performed in a test laboratory using a model of a human body. After the PD distributions are generated, the PD distributions may be stored in the memory to enable the processor (e.g., processor 266 of FIG. 2 or processor 334 of FIG. 3) to assess RF exposure in real time, as discussed further below. Each PD distribution includes a set of PD values, where each PD value may correspond to a different location (e.g., on the model of the human body).

The PD values in each PD distribution may correspond to a particular transmission power level (e.g., the transmission power level at which the PD values were measured in the test laboratory). Accordingly, since PD scales with transmission power level, the processor may scale a PD distribution for any transmission power level by multiplying each PD value in the PD distribution by the following transmission power scaler:

$$\frac{Tx_c}{Tx_{PD}} \quad \text{(eq. 4)}$$

where $Tx_c$ is a current transmission power level for the respective transmit scenario, and TXPD is the transmission power level corresponding to the PD values in the PD distribution (e.g., the transmission power level at which the PD values were measured in the test laboratory).

As discussed above, the wireless device may support multiple transmit scenarios for the second technology. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless device relative to the user's body location (head, trunk, away from the body, etc.), and/or other parameters.

In cases where the wireless device supports a large number of transmit scenarios, it may be very time-consuming and expensive to perform measurements for each transmit scenario in a test setting (e.g., test laboratory). To reduce test time, measurements may be performed for a subset of the transmit scenarios to generate PD distributions for the subset of transmit scenarios. In this example, the PD distribution for each of the remaining transmit scenarios may be generated by combining two or more of the PD distributions for the subset of transmit scenarios, as discussed further below.

For example, PD measurements may be performed for each one of the antennas to generate a PD distribution for each one of the antennas. In this example, a PD distribution for a transmit scenario in which two or more of the antennas are active may be generated by combining the PD distributions for the two or more active antennas.

In another example, PD measurements may be performed for each one of multiple frequency bands to generate a PD distribution for each one of the multiple frequency bands. In this example, a PD distribution for a transmit scenario in which two or more frequency bands are active may be generated by combining the PD distributions for the two or more active frequency bands.

In certain aspects, a PD distribution may be normalized with respect to a PD limit by dividing each PD value in the PD distribution by the PD limit. In this case, a normalized PD value exceeds the PD limit when the normalized PD value is greater than one, and is below the PD limit when the normalized PD value is less than one. In these aspects, each of the PD distributions stored in the memory may be normalized with respect to a PD limit.

In certain aspects, the normalized PD distribution for a transmit scenario may be generated by combing two or more normalized PD distributions. For example, a normalized PD distribution for a transmit scenario in which two or more antennas are active may be generated by combining the normalized PD distributions for the two or more active antennas. For the case in which different transmission power levels are used for the active antennas, the normalized PD distribution for each active antenna may be scaled by the respective transmission power level before combining the normalized PD distributions for the active antennas. The normalized PD distribution for simultaneous transmission from multiple active antennas may be given by the following:

$$PD_{norm\_combined} = \sum_{i=1}^{i=L} \frac{Tx_i}{Tx_{PDi}} \cdot \frac{PD_i}{PD_{lim}} \quad \text{(eq. 5)}$$

where $PD_{lim}$ is a PD limit, $PD_{norm\_combined}$ is the combined normalized PD distribution for simultaneous transmission from the active antennas, i is an index for the active antennas, $PD_i$ is the PD distribution for the $i^{th}$ active antenna, $Tx_i$ is the transmission power level for the $i^{th}$ active antenna, $Tx_{PDi}$ is the transmission power level for the PD distribution for the $i^{th}$ active antenna, and L is the number of the active antennas.

Equation 5 may be rewritten as follows:

$$PD_{norm\_combined} = \sum_{i=1}^{i=L} \frac{Tx_i}{Tx_{PDi}} \cdot PD_{norm\_i} \quad \text{(eq. 6a)}$$

where $PD_{norm\_i}$ is the normalized PD distribution for the $i^{th}$ active antenna. In the case of simultaneous transmissions using multiple active antennas at the same transmitting frequency (e.g., MIMO), the combined normalized PD distribution is obtained by summing the square root of the individual normalized PD distributions and computing the square of the sum, as given by the following:

$$PD_{norm\_combined\_MIMO} = \left[ \sum_{i=1}^{i=L} \sqrt{\frac{Tx_i}{Tx_{PDi}} \cdot PD_{norm\_i}} \right]^2. \quad \text{(eq. 6b)}$$

In another example, normalized PD distributions for different frequency bands may be stored in the memory. In this example, a normalized PD distribution for a transmit scenario in which two or more frequency bands are active may be generated by combining the normalized PD distributions for the two or more active frequency bands. For the case where the transmission power levels are different for the active frequency bands, the normalized PD distribution for each of the active frequency bands may be scaled by the respective transmission power level before combining the normalized PD distributions for the active frequency bands. In this example, the combined PD distribution may also be computed using equation 6a in which i is an index for the active frequency bands, $PD_{norm\_i}$ is the normalized PD distribution for the $i^{th}$ active frequency band, $Tx_i$ is the transmission power level for the $i^{th}$ active frequency band, and $Tx_{PDi}$ is the transmission power level for the normalized PD distribution for the $i^{th}$ active frequency band.

Example Signal-Type-Based Power Limits

As noted above, in wireless communication, there is a maximum permissible exposure (MPE) limit imposed by international regulators, including the International Commission on Non-Ionizing Radiation Protection (ICNIRP) and the Federal Communications Commission (FCC) in the United States, which specifies the highest power or energy density (in $W/cm^2$ or $J/cm^2$) of an electromagnetic source that is considered safe for human exposure. In some cases, the MPE limit(s) may be converted into a constraint related to the maximum transmission power by one or more devices (e.g., depending on the implementation of each of the devices) and, thus, a signal transmitted by a device may be limited due to MPE compliance.

Currently, all types of uplink (UL) signals may share a same power limit due to MPE. As a result, the shared power limits may significantly reduce an available transmission power for mission critical signals, such as a control signal. For example, in a 5G millimeter wave (mmWave) application, in certain cases, the UL may be significantly power limited due to MPE and an UL data signal (e.g., transmitted on a physical uplink shared channel (PUSCH)) may use up all or most of the available power limit, leaving no or very little power limit for a control signal (e.g., transmitted on a physical uplink control channel (PUCCH)), resulting in failure of the control channel.

Thus, aspects of the present disclosure provide techniques to help alleviate this issue with power limit allocation. For example, in some cases, aspects provide techniques that allocate power limit based on a type of signal to be transmitted. More specifically, in some cases, higher priority types of signals (e.g., such as mission critical/control signals) may be allocated power before lesser priority types of signals (e.g., data signals), alleviating the possibility of channel failure associated with the higher priority signals.

Figure 4:
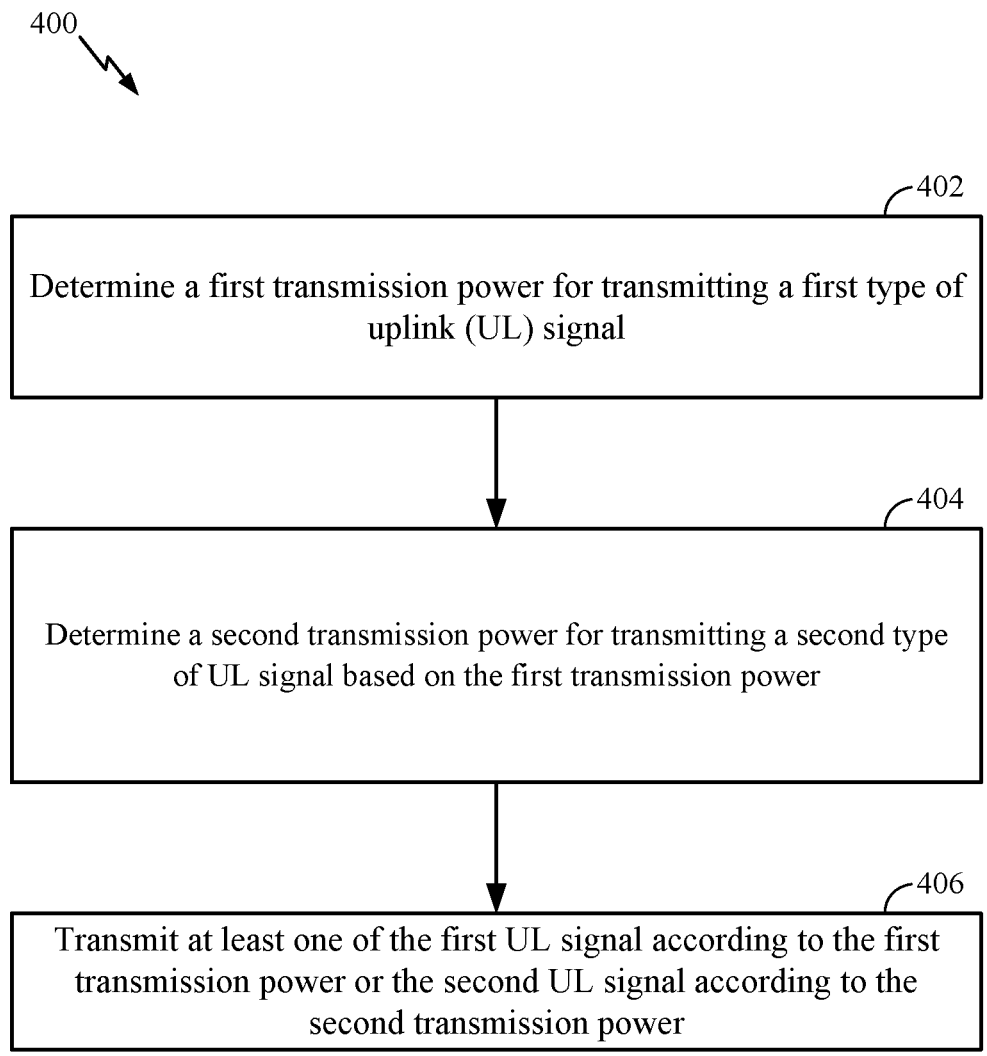
FIG. 4 is a flow diagram of example operations for wireless communications, in accordance with certain aspects of the present disclosure.

FIG. 4 is a flow diagram illustrating example operations 400 for determining transmission power levels according to signal types and RF exposure limits, in accordance with certain aspects of the present disclosure. The operations 400 may be performed, for example, by a wireless device (e.g., such as a UE 120a in the wireless communication network 100). Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Additionally, in some cases, the operations 400 may be performed by a transceiver front-end (e.g., transceiver front-end 300 of FIG. 3) of a wireless device, such as the processor 334, TX path 302, and interface 306 of FIG. 3. For example, a processor (e.g., processor 334 of FIG. 3) may be configured to perform blocks 402, 404, 406 of the operations 400, described below, and an interface (e.g., interface 306) and/or antenna (e.g., antenna 303) may be configured to output one or more signals for transmission.

The operations 400 may begin, at block 402, with the wireless device determining a first transmission power for transmitting a first type of uplink (UL) signal.

At block 404, the wireless device determines a second transmission power for transmitting a second type of UL signal. As will be described below, determining the first transmission power and/or determining the second transmission power may be based on at least one of a radio frequency (RF) exposure limit or a transmission power limit for transmitting UL signals by the UE. In some cases, the second transmission power may be determined after the first transmission power and from a remaining RF exposure (e.g., remaining from the first transmission power determination), as described in greater detail below.

At block 406, the wireless device transmits at least one of the first UL signal according to the first transmission power or the second UL signal according to the second transmission power.

As noted, aspects of the present disclosure provide techniques for power limit allocation based on a signal type of an UL signal to be transmitted. For example, as noted above, the UE may determine a first transmission power for transmitting a first type of UL signal and determine a second transmission power for transmitting a second type of UL signal.

In some cases, the first type of UL signal may comprise a control signal and the second type of UL signal may comprise a data signal. According to aspects, the transmission power determination may be based on a priority between types of signals. For example, in some cases, the control signal may have a higher priority to an available transmission power for the transmitting than the data signal. Thus, in some cases, as noted above, the first transmission power determination may take priority over the second transmission power.

According to aspects, the first transmission power and/or the second transmission power may be determined based on at least one of a radio frequency (RF) exposure limit (e.g., a power density (PD) limit or a specific absorption rate (SAR) limit) or a transmission power limit for transmitting UL signals by the UE. For example, in some cases, determining the first transmission power may include determining a first RF exposure associated with transmitting the first type of UL signal. Thereafter, the first transmission power may be determined based on the determined first RF exposure associated with transmitting the first type of UL signal. More specifically, for example, determining the first transmission power based on the determined first RF exposure may include determining a maximum transmission power for the first type of UL signal that satisfies the first RF exposure over a particular period of time or time window, wherein the first transmission power comprises the maximum transmission power for the first type of UL signal.

Likewise, determining a second transmission power may be based on a second RF exposure available for the second type of UL signal. In some cases, the second RF exposure available for the second type of UL signal may be based, at least in part, on the first RF exposure. For example, in some cases, as noted above, since the first type of UL signal may take priority over the second type of UL signal, the first RF exposure associated with the first UL signal may be determined first from the RF exposure limit. The second RF exposure may then be determined after the first RF exposure from a remaining available RF exposure based on a difference between the RF exposure limit and the determined first RF exposure associated with transmitting the first type of UL signal. In other words, the second RF exposure available for the second type of UL signal represents a remaining available RF exposure based on a difference between the RF exposure limit and the determined first RF exposure associated with transmitting the first type of UL signal.

According to aspects, as with the first transmission power determination, determining the second transmission power based on the determined second RF exposure may include determining a maximum transmission power for the second type of signal that satisfies the second RF exposure over a particular period of time or time window, wherein the second transmission power comprises the maximum transmission power for the second type of signal. According to aspects, in some cases, the second transmission power may differ from the first transmission power during a time interval. Further, during the time interval, a sum of the first transmission power and the second transmission power is no greater than a transmission power limit for the time interval.

In some cases, the first RF exposure and the second RF exposure may be based, at least in part, on one or more system parameters, which may vary over a period of time or time window. For example, in some cases, the first RF exposure and the second RF exposure may be based on more or more system parameters such as the RF exposure limit, a first traffic condition associated with a first channel for transmitting the first type of UL signal, a second traffic condition associated with a second channel for transmitting the second type of UL signal, path loss observed at the UE, interference from other UEs, and the like. According to aspects, as the one or more system parameters may vary over time, the UE may update at least one of the first RF exposure or the second RF exposure when the one or more system parameters are updated.

Figure 5:
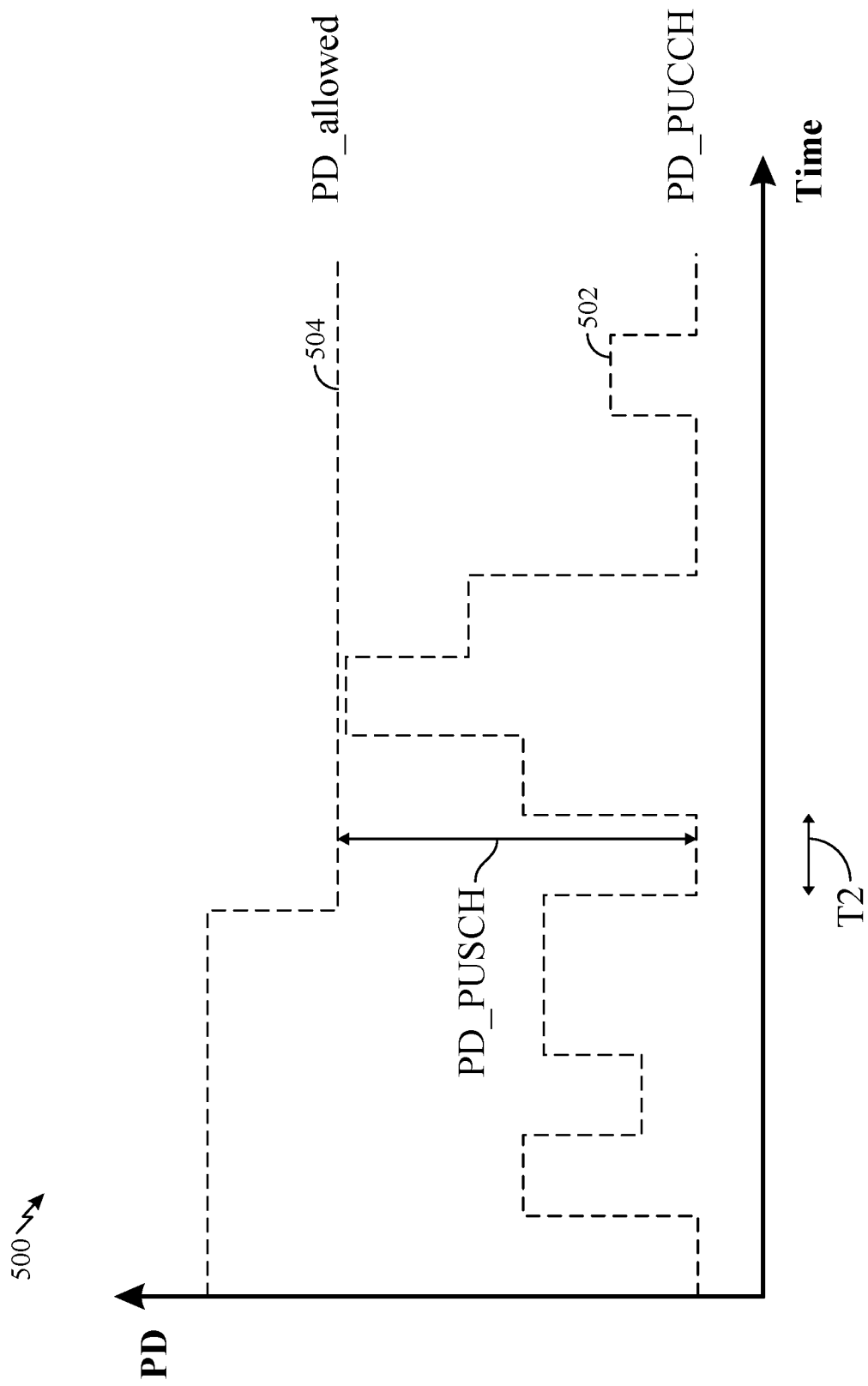
FIG. 5 illustrates an example RF exposure allocation timeline for different types of signals, in accordance with certain aspects of the present disclosure.

FIG. 5 illustrates an example RF exposure allocation timeline 500 for different types of signals, in accordance with certain aspects presented herein. For example, as illustrated, the first type of UL signal may comprise a control signal transmitted on a physical uplink control channel (PUCCH), and the second type of UL signal may comprise a data signal transmitted on a physical uplink shared (PUSCH) channel.

According to aspects, a determination of a first RF exposure (or corresponding transmission power) for the first type of UL signal may be given priority over a determination of the second RF exposure (or corresponding transmission power) for the second type of UL signal. For example, as illustrated, the dashed line 502 may represent an RF exposure or power density corresponding to a transmission (Tx) power required by the first type of UL signal to be able to "close" the channel (e.g., to be able to be correctly received at a receiver), for each time interval T2. At any given time, as illustrated, the RF exposure/PD corresponding to the Tx power required by the first type of UL signal may change, for example, based on one or more system parameters described above.

According to aspects, once the first RF exposure associated with the first type of UL signal (e.g., $PD_{cch}$ corresponding to a PUCCH) has been determined, the second RF exposure associated with the second type of UL signal (e.g., $PD_{sch}$ corresponding to a PUSCH) may be determined from a remaining RF exposure, as set by an RF exposure limit. For example, as illustrated at time T2, the second RF exposure associated with the second type of UL signal may comprise a difference between the RF exposure limit 504 (e.g., $PD_{allowed}$ or PD limit) and the first RF exposure associated with the first type of UL signal (e.g., $PD_{cch}$). As noted above, once the first RF exposure and the second RF exposure have been determined, the UE may determine the first transmission power for transmitting the first type of UL signal and the second transmission power for transmitting the second type of UL signal based, at least in part, on the first RF exposure and the second RF exposure, using a calculation (e.g., a scaling factor) or a lookup table (LUT), for example. Additionally, since the first RF exposure and the second RF exposure may vary over time, so too may the first transmission power for transmitting the first type of UL signal and the second transmission power for transmitting in the second type of UL signal. Furthermore, the RF exposure limit (e.g., $PD_{allowed}$) may change with time, such as between different time windows.

Figure 6:
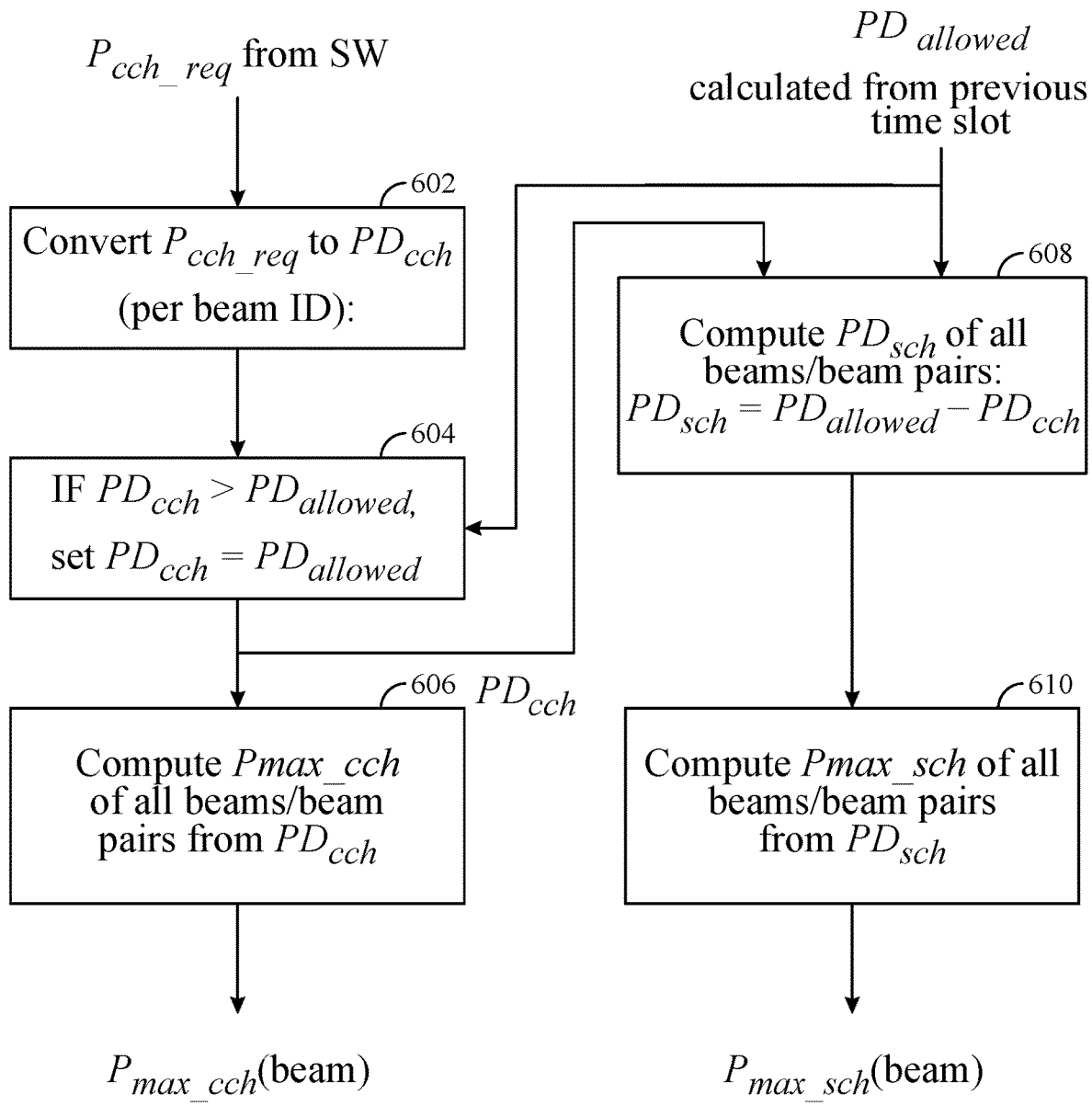
FIG. 6 illustrates an example flow diagram for determining maximum transmission powers for different types of signals, in accordance with certain aspects of the present disclosure.

FIG. 6 illustrates a flow diagram for determining maximum transmission powers for different types of UL signals, in accordance with certain aspects presented herein. For example, as illustrated, the flow diagram of FIG. 6 illustrates example operations for determining separate maximum transmission powers for a first type of UL signal (e.g., $P_{max\_cch}$), such as a PUCCH, and a second type of UL signal (e.g., $P_{max\_sch}$), such as a PUSCH.

According to aspects, as illustrated at 602, the UE may begin determining a maximum transmission power (e.g., $P_{max\_cch}$) for a first type of UL signal (e.g., a PUCCH) by determining a first RF exposure (e.g., $PD_{cch}$) for the first type of UL signal. The first RF exposure, $PD_{cch}$, may be determined by the UE based on a required transmission power for the first type of UL signal (e.g., $P_{cch\_req}$). In some cases, $P_{cch\_req}$ may be determined on a transmission beam basis (e.g., per beam ID) according to:

$$P_{cch\_req\_dB} = P_{O\_PUCCH} + PL + \Delta_{F\_PUCCH} \qquad \text{(eq. 7)}$$

where $P_{O\_PUCCH}$ is a desired PUCCH receive power, PL is a path loss between the UE and gNB, and $A_{F\_PUCCH}$ is a power adjustment factor.

After determining the required power for the first type of UL signal (e.g., $P_{cch\_req}$), the UE may convert $P_{cch\_req}$ into an RF exposure (e.g., $PD_{cch}$) for the first type of UL signal on a per-transmission-beam basis (e.g., per beam ID).

Thereafter, as illustrated in 604, the UE may compare $PD_{cch}$ with an RF exposure limit (e.g., $PD_{allowed}$, as discussed above). The RF exposure limit, $PD_{allowed}$, may be determined from a previous time slot. According to aspects, as illustrated, if $PD_{cch}$ is greater than $PD_{allowed}$ (e.g., $PD_{cch} > PD_{allowed}$), the UE may set $PD_{cch}$ equal to $PD_{allowed}$; otherwise if $PD_{cch}$ is less than $PD_{allowed}$ (e.g., $PD_{cch} > PD$ allowed), the UE may continue to use the calculated $PD_{cch}$.

Thereafter, as illustrated in 606, the maximum transmission power (e.g., $P_{max\_cch}$) for the first type of UL signal for all beams/beam pairs may then be determined by the UE based on the per-beam RF exposure (e.g., $PD_{cch}$) for the first type of UL.

As illustrated at 608, an RF exposure for the second type of UL signal for all beams/beam pairs (e.g., $PD_{sch}$) may then be determined by the UE based on the per-beam RF exposure (e.g., $PD_{cch}$) for the first type of UL and the RF exposure limit (e.g., $PD_{allowed}$). For example, as illustrated and noted above, the RF exposure for the second type of UL signal may be determined as the difference between $PD_{allowed}$ and $PD_{cch}$.

Thereafter, as illustrated in 610, the maximum transmission power (e.g., $P_{max\_sch}$) for the second type of UL signal for all beams/beam pairs may then be determined by the UE based on the per-beam RF exposure (e.g., $PD_{sch}$) for the second type of UL.

Accordingly, once the first RF exposure and the second RF exposure have been determined, the UE may determine the first transmission power for transmitting the first type of UL signal and the second transmission power for transmitting the second type of UL signal based, at least in part, on the maximum transmission power (e.g., $P_{max\_cch}$) for the first type of UL signal and the maximum transmission power (e.g., $P_{max\_sch}$) for the second type of UL signal, respectively.

In the present disclosure, the maximum transmission power level may refer to a maximum allowable power level imposed by an RF exposure limit unless stated otherwise. It is to be appreciated that the maximum allowed transmission power level is not necessarily equal to the absolute maximum power level that complies with an RF exposure limit and may be less than the absolute maximum power level that complies with the RF exposure limit (e.g., to provide a safety margin). The maximum allowed transmission power level may be used to set a power level on a transmission at a transmitter such that the power level of the transmission is not allowed to exceed the maximum allowed transmission power level to ensure RF exposure compliance.

Figure 7:
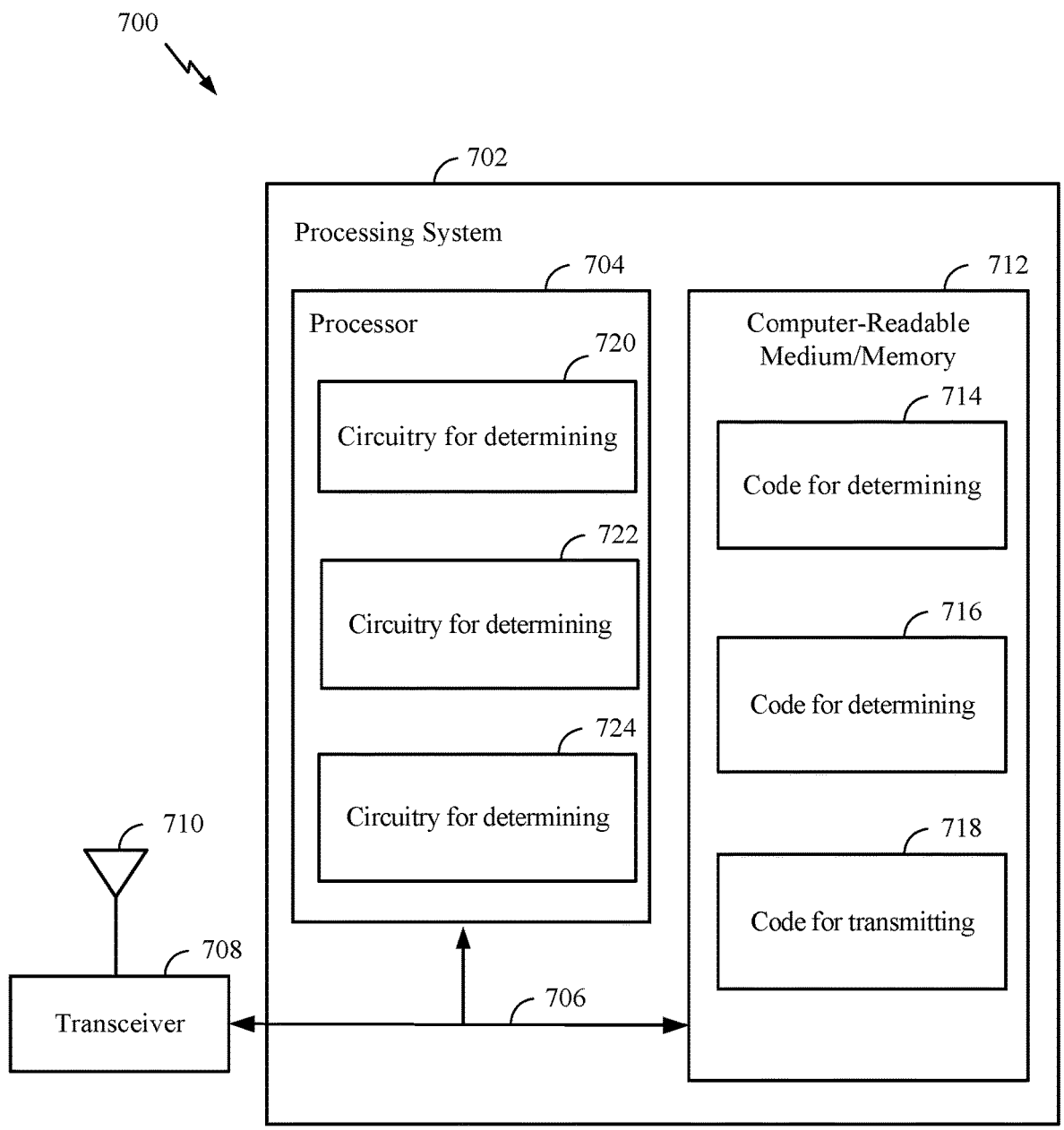
FIG. 7 illustrates a communications device that may include various components configured to perform operations for the techniques disclosed herein, in accordance with certain aspects of the present disclosure.

FIG. 7 illustrates a communications device 700 that may include various components (e.g., corresponding to means-plus-function components) configured to perform operations for the techniques disclosed herein, such as the operations illustrated in FIG. 4 and other operations disclosed herein for determining transmission power levels according to signal types and RF exposure limits. The communications device 700 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 4, or other operations for performing the various techniques discussed herein for determining transmission power levels according to signal types and RF exposure limits. In certain aspects, computer-readable medium/memory 712 stores code 714 for determining a first transmission power for transmitting a first type of uplink (UL) signal; code 716 for determining a second transmission power for transmitting a second type of UL signal based on the first transmission power; and code 718 for transmitting at least one of the first UL signal according to the first transmission power or the second UL signal according to the second transmission power.

In certain aspects, the processor 704 has circuitry configured to implement the code stored in the computer-readable medium/memory 712. For example, the processor 704 includes circuitry 720 for determining a first transmission power for transmitting a first type of uplink (UL) signal; circuitry 722 for determining a second transmission power for transmitting a second type of UL signal based on the first transmission power; and circuitry 724 for transmitting at least one of the first UL signal according to the first transmission power or the second UL signal according to the second transmission power.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one" of a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4 and 6 as well as other operations described herein for determining transmission power levels according to signal types and RF exposure limits.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment (UE), comprising:
    determining a first radio frequency (RF) exposure metric associated with transmitting a first type of uplink (UL) signal based on one or more system parameters, wherein the one or more system parameters vary between time slots;
    setting a first transmission power for transmitting the first type of UL signal based on the first RF exposure metric;
    determining a second RF exposure metric available for a second type of UL signal based on the first RF exposure metric, the first transmission power, and the one or more system parameters;
    setting a second transmission power for transmitting the second type of UL signal based on the second RF exposure metric;
    transmitting at least one of the first UL signal according to the first transmission power or the second UL signal according to the second transmission power; and
    updating at least one of the first RF exposure metric or the second RF exposure metric based on a detection that the one or more system parameters have changed from a previous time slot, wherein the one or more system parameters comprise at least one of:
        an RF exposure limit;
        a first traffic condition associated with a first channel for transmitting the first type of UL signal; or
        a second traffic condition associated with a second channel for transmitting the second type of UL signal.

2. The method of claim 1, wherein:
the first type of UL signal comprises a control signal; and
the second type of UL signal comprises a data signal.

3. The method of claim 2, wherein the control signal has a higher priority to an available transmission power density for the transmitting than the data signal.

4. The method of claim 1, wherein at least one of setting the first transmission power or setting the second transmission power is further based on at least one of the RF exposure limit or a transmission power limit for transmitting UL signals by the UE.

5. The method of claim 4, wherein the RF exposure limit comprises a power density (PD) limit or a specific absorption rate (SAR) limit.

6. The method of claim 4, wherein the second RF exposure metric available for the second type of UL signal represents a remaining available RF exposure based on a difference between the RF exposure limit and the determined first RF exposure associated with transmitting the first type of UL signal.

7. The method of claim 4, wherein the first RF exposure metric and the second RF exposure metric are based, at least in part, on a priority between the first type of UL signal and the second type of UL signal.

8. The method of claim 7, wherein:
the first type of UL signal is of a higher priority than the second type of UL signal;
the first RF exposure metric is determined first based on the RF exposure limit; and
the second RF exposure metric is determined after the first RF exposure metric from a remaining available RF exposure based on a difference between the RF exposure limit and the determined first RF exposure metric associated with transmitting the first type of UL signal.

9. The method of claim 1, wherein the second transmission power differs from the first transmission power during a time interval.

10. The method of claim 1, wherein during a time interval, a sum of the first transmission power and the second transmission power is no greater than a transmission power limit for the time interval.

11. The method of claim 1, wherein:
setting the first transmission power comprises setting the first transmission power for a future time slot based on a time-averaged RF exposure, and
setting the second transmission power comprises setting the second transmission power for the future time slot based on the first transmission power for the future time slot and the time-averaged RF exposure.

12. The method of claim 1, wherein the one or more system parameters further comprise at least one of:
a path loss observed at the UE; or
interference from one or more other UEs.

13. The method of claim 1, wherein the one or more system parameters comprise the RF exposure limit.

14. The method of claim 1, wherein, based on the one or more system parameters, at least one of the first RF exposure metric or the second RF exposure metric varies between slots.

15. An apparatus for wireless communication, comprising:
a memory comprising executable instructions; and
a processor configured to execute the executable instructions and cause the apparatus to:
determine a first radio frequency (RF) exposure metric associated with transmitting a first type of uplink (UL) signal based on one or more system parameters, wherein the one or more system parameters vary between time slots;
set a first transmission power for transmitting the first type of UL signal based on the first RF exposure metric;
determine a second RF exposure metric available for a second type of UL signal based on the first RF exposure metric, the first transmission power, and the one or more system parameters;
set a second transmission power for transmitting the second type of UL signal based on the second RF exposure metric;
transmit at least one of the first UL signal according to the first transmission power or the second UL signal according to the second transmission power; and
update at least one of the first RF exposure metric or the second RF exposure metric based on a detection that the one or more system parameters have changed from a previous time slot, wherein the one or more system parameters comprise at least one of:
an RF exposure limit;
a first traffic condition associated with a first channel for transmitting the first type of UL signal; or
a second traffic condition associated with a second channel for transmitting the second type of UL signal.

16. The apparatus of claim 15, wherein:
the first type of UL signal comprises a control signal; and
the second type of UL signal comprises a data signal.

17. The apparatus of claim 16, wherein the control signal has a higher priority to an available transmission power density for the transmitting than the data signal.

18. The apparatus of claim 15, wherein the processor is further configured to set at least one of the first transmission power or the second transmission power based on at least one of the RF exposure limit or a transmission power limit for transmitting UL signals by the apparatus.

19. The apparatus of claim 18, wherein the RF exposure limit comprises a power density (PD) limit or a specific absorption rate (SAR) limit.

20. The apparatus of claim 18, wherein the second RF exposure available for the second type of UL signal represents a remaining available RF exposure based on a difference between the RF exposure limit and the determined first RF exposure associated with transmitting the first type of UL signal.

21. The apparatus of claim 18, wherein:
the first RF exposure metric and the second RF exposure metric are based, at least in part, on a priority between the first type of UL signal and the second type of UL signal;
the first type of UL signal is of a higher priority than the second type of UL signal;
the processor is further configured to determine the first RF exposure metric first based on the RF exposure limit; and
the processor is further configured to determine the second RF exposure metric after the first RF exposure metric from a remaining available RF exposure based on a difference between the RF exposure limit and the determined first RF exposure metric associated with transmitting the first type of UL signal.

22. The apparatus of claim 15, wherein:
the second transmission power differs from the first transmission power during a time interval; and
during the time interval, a sum of the first transmission power and the second transmission power is no greater than a transmission power limit for the time interval.

23. An apparatus for wireless communication, comprising:
means for determining a first RF exposure metric associated with transmitting a first type of uplink (UL) signal based on one or more system parameters, wherein the one or more system parameters vary between time slots;
means for setting a first transmission power for transmitting the first type of UL signal based on the first RF exposure metric;
means for determining a second RF exposure metric available for a second type of UL signal based on the first RF exposure metric, the first transmission power, and the one or more system parameters;

means for setting a second transmission power for transmitting the second type of UL signal based on the second RF exposure metric;
means for transmitting at least one of the first UL signal according to the first transmission power or the second UL signal according to the second transmission power; and
means for updating at least one of the first RF exposure or the second RF exposure based on a detection that the one or more system parameters have changed from a previous time slot, wherein the one or more system parameters comprise at least one of:
an RF exposure limit;
a first traffic condition associated with a first channel for transmitting the first type of UL signal; or
a second traffic condition associated with a second channel for transmitting the second type of UL signal.

24. A non-transitory computer-readable medium for wireless communication, comprising:
instructions that, when executed by at least one processor of an apparatus, cause the apparatus to:
determine a first RF exposure metric associated with transmitting a first type of uplink (UL) signal based on one or more system parameters, wherein the one or more system parameters vary between time slots;
set a first transmission power for transmitting the first type of UL signal based on the first RF exposure metric;
determine a second RF exposure metric available for a second type of UL signal based on the first RF exposure metric, the first transmission power, and the one or more system parameters;
set a second transmission power for transmitting the second type of UL signal based on the second RF exposure metric;
transmit at least one of the first UL signal according to the first transmission power or the second UL signal according to the second transmission power; and
update at least one of the first RF exposure or the second RF exposure based on a detection that the one or more system parameters have changed from a previous time slot, wherein the one or more system parameters comprise at least one of:
an RF exposure limit;
a first traffic condition associated with a first channel for transmitting the first type of UL signal; or
a second traffic condition associated with a second channel for transmitting the second type of UL signal.

* * * * *